United States Patent
Kang et al.

(10) Patent No.: US 6,778,606 B2
(45) Date of Patent: Aug. 17, 2004

(54) SELECTIVE MOTION ESTIMATION METHOD AND APPARATUS

(75) Inventors: Hyun Soo Kang, Seoul (KR); Kyeong Joong Kim, Seoul (KR); Jae Won Chung, Seoul (KR)

(73) Assignee: Hyundai Curitel, Inc., Kyoungki-do (KR)

( * ) Notice: Subject to any disclaimer, the term of this patent is extended or adjusted under 35 U.S.C. 154(b) by 728 days.

(21) Appl. No.: 09/782,568

(22) Filed: Feb. 13, 2001

(65) Prior Publication Data

US 2001/0026590 A1 Oct. 4, 2001

(30) Foreign Application Priority Data

Feb. 21, 2000 (KR) .......................................... 2000-8221

(51) Int. Cl.[7] ................................................ H04N 7/12
(52) U.S. Cl. ................................................. 375/240.16
(58) Field of Search .......... 375/240.01, 240.12–240.16, 375/240.24; H04N 7/12

(56) References Cited

U.S. PATENT DOCUMENTS 5,515,114 A  5/1996  Murata
5,973,742 A  10/1999 Gardyne et al.

FOREIGN PATENT DOCUMENTS

JP            11-69358         3/1999

*Primary Examiner*—Young Lee
(74) *Attorney, Agent, or Firm*—Merchant & Gould P.C.

(57) ABSTRACT

A motion vector estimation apparatus in a digital video coding system and a method thereof. More particularly, the present invention relates to a motion estimation method and apparatus for, prior to a motion vector estimation operation, determining whether to perform it and selectively performing the motion vector estimation operation in accordance with the determined result, thereby reducing the coding time period and the amount of power consumed.

11 Claims, 7 Drawing Sheets

FIG. 3
(PRIOR ART)
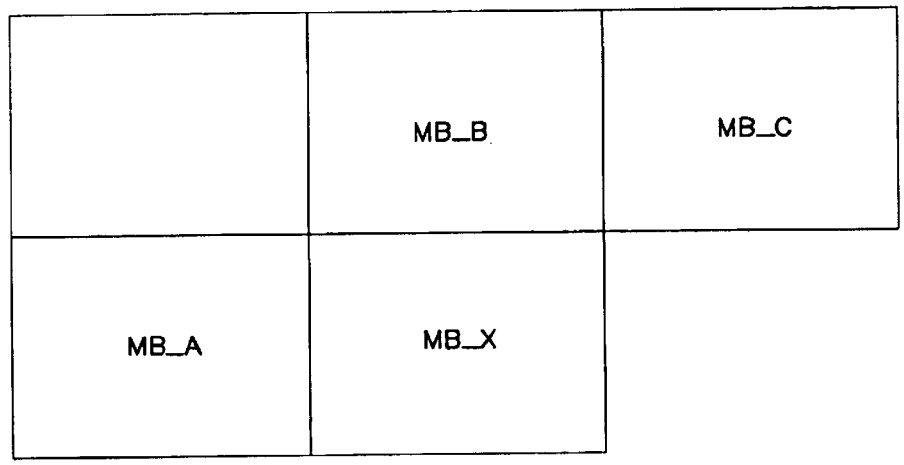
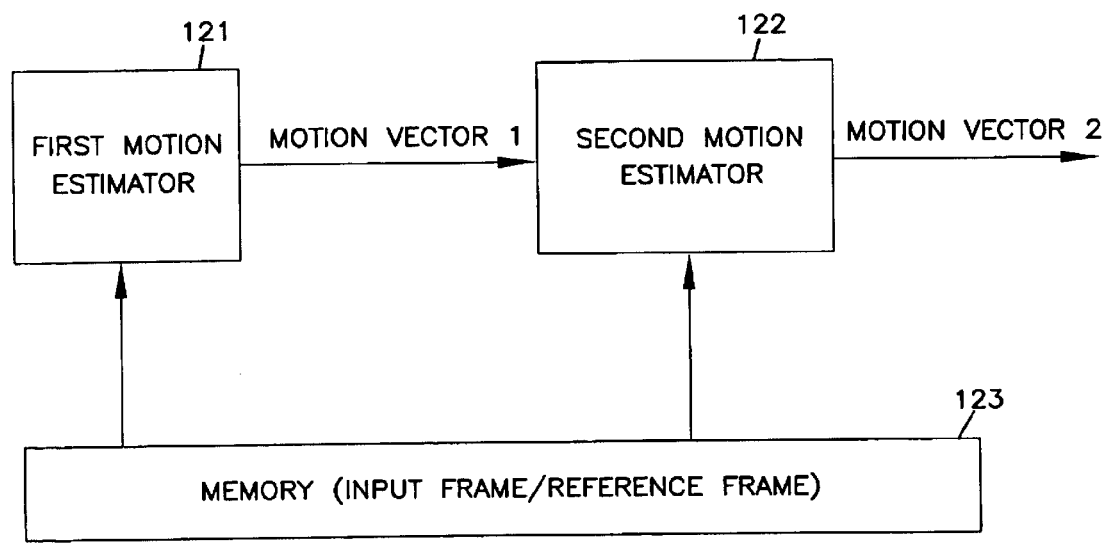
FIG. 4
(PRIOR ART)

SELECTIVE MOTION ESTIMATION METHOD AND APPARATUS

BACKGROUND OF THE INVENTION

1. Field of the Invention

The present invention relates in general to a motion vector estimation apparatus in a digital video coding system and a method thereof, and more particularly to a motion estimation method and apparatus for, prior to a motion vector estimation operation, determining whether to perform it and selectively performing the motion vector estimation operation in accordance with the determined result, thereby reducing the amount of power consumed.

2. Description of the Prior Art

Generally, video signal compression coding and decoding can desirably reduce the capacity of memory necessary for storing image information as well as transmit the image information over a low-rate channel. In this regard, such compression coding and decoding techniques occupy a very important part of the multimedia industry requiring a variety of image applications such as image storage, image transmission, etc.

FIG. 1 is a block diagram showing the construction of a conventional digital video coding system. For the efficient video compression coding, there is generally used a method for estimating a motion vector with reference to a previous frame for the coding of a current frame, performing a motion compensated prediction operation using the estimated motion vector and coding the resulting prediction error. With reference to FIG. 1, the conventional video coding system comprises a transform unit 20 for performing a transform operation for a frame difference between an input current frame and a motion compensated prediction frame obtained by a motion compensation predictor 10, a quantizer 30 for quantizing transform coefficients from the transform unit 20 for data compression, a variable length coder 40 for performing a variable length coding (VLC) operation for the transform coefficients quantized by the quantizer 30, a dequantizer 50 and an inverse transform unit 60. In this coding system, the frame difference is reconstructed by the dequantizer 50 and inverse transform unit 60 and applied to the motion compensation predictor 10, which then adds it to the motion compensated prediction frame to obtain a reconstructed frame. On the other hand, the motion compensation predictor 10 performs a motion vector estimation operation using the input current frame and the previous frame and finds the prediction frame using an estimated motion vector. The motion compensation predictor 10 also performs a motion compensated prediction operation and transfers the estimated motion vector to the variable length coder 40, which then variable length codes and transmits it together with the transform coefficients quantized by the quantizer 30. An image information bit stream output from the variable length coder 40 is transmitted to a receiver or a multiplexer for its multiplexing with other signals.

In a general video coding method and system, motion prediction and compensation operations are not performed on a frame basis, but in the unit of a predetermined number of picture elements or pixels (M pixels in the horizontal direction and N pixels in the vertical direction, typically indicated by M×N pixels). This group of pixels is typically called a macroblock. It is generally prescribed that the macroblock be sized with 16 pixels in the horizontal direction and 16 pixels in the vertical direction (referred to hereinafter as "16×16"). In the present invention, although the size of the macroblock is not limited to a specific value, it will be described as 16×16 as an example for the convenience of description. A motion vector is two-dimensional information indicative of the quantity of motion of an object in the previous and current frames on two-dimensional X–Y coordinates. Namely, the motion vector consists of a transversal motion value and a longitudinal motion value.

FIG. 2 is a detailed block diagram of the motion compensation predictor 10 in the conventional digital video coding system of FIG. 1. As shown in this drawing, the motion compensation predictor 10 includes a motion compensation unit 11 for performing a motion compensation operation, a motion estimation unit 12 for performing a motion vector estimation operation, and a previous image reconstruction unit 13 for obtaining a reconstructed version of the previous frame to be used to obtain the motion compensated prediction frame. The previous image reconstruction unit 13 obtains a reconstructed version of the coded frame by adding the reconstructed version of the frame difference transferred from the inverse transform unit 60 to a previous reconstructed frame stored therein. The reconstructed frame obtained by the previous image reconstruction unit 13 is then used as an input to the motion estimation unit 12 for the motion estimation of the subsequent input frame. The motion estimation unit 12 performs the motion vector estimation operation for the coding of the current input frame on the basis of the output frame from the previous image reconstruction unit 13 and the current input frame and outputs the resulting motion vector, which is then transferred to the variable length coder 40 for its variable length coding. The variable length coder 40 can code input values with a much smaller number of bits than fixed length coding (FLC) by assigning a smaller number of bits to a value with a higher generation frequency and a larger number of bits to a value with a lower generation frequency, respectively. On the other hand, the motion vector output from the motion estimation unit 12 is applied to the motion compensation unit 11, which then performs the motion compensation operation using the applied motion vector and thus finally produces the prediction frame.

As an alternative, the previous original frame may be used as an input frame for the motion estimation instead of the previous reconstructed frame. In this case, a memory for storing the previous original frame must be provided in the construction of FIG. 2. It should be noted that the use of the previous original frame as the reference frame is valid only for the motion estimation and the previous reconstructed frame is always used as the input to the motion compensation unit. The reason is that a decoder is able to perform a decoding operation on the basis of the previous reconstructed frame. Hereinafter, both the frames will be referred to as reference frames.

A motion vector has a close correlation with the surrounding blocks or macroblocks because of image characteristics. Accordingly, the coding efficiency can be increased by variable length coding a difference vector between a current motion vector and a motion vector predicted using motion vectors of the surrounding blocks or macroblocks, rather than directly variable length coding the current motion vector. The reason is that the difference vector is 0 or a value approximate to 0 at a significantly high frequency.

FIG. 3 is a view showing the position of a macroblock to be currently coded and the positions of the surrounding macroblocks used for the prediction of a motion vector of the macroblock to be currently coded. Generally, a predicted motion vector can be determined using adjacent motion vectors in the following manner. That is, the predicted motion vector is determined as the median value of motion vectors of three macroblocks, or the left macroblock MB_A, the upper macroblock MB_B and the upper right macroblock MB_C, around a macroblock (MB_X) to be currently coded. A difference vector between the determined predicted motion vector and the current motion vector is obtained and then variable length coded. This method is typically used in ITU-T H.263 and ISO/IEC MPEG-4.

FIG. 4 is a detailed block diagram of the motion estimation unit 12 in the motion compensation predictor 10 of FIG. 2. For motion vector estimation, there have generally been proposed a full search method, pyramidal search method, three-step search method, four-step search method, etc., which have different computational complexities. Particularly among them, the full search method requires a considerable amount of computation, but has the best performance. In the conventional video coding system, the motion estimation unit 12 is basically composed of two parts, or a first motion estimator 121 and a second motion estimator 122. The first motion estimator 121 performs an integer-pixel-unit motion vector estimation operation. For example, the first motion estimator 121 may perform the motion vector estimation operation in the unit of one pixel in the full search method and in the unit of one pixel or of two or more pixels in the pyramidal search method, respectively. Namely, the motion vector estimation unit of the first motion estimator 121 depends on the search method. The second motion estimator 122 searches more minutely for motion vectors around a motion vector 1 obtained by the first motion estimator 121, namely, generally performs a half-pixel-unit motion vector estimation operation. The first motion estimator 121 and the second motion estimator 122 perform their respective operations using frames stored in a memory 123.

As stated previously, the motion vector estimation operation is performed on a macroblock basis. This motion vector estimation signifies a procedure for searching a reference frame for a portion most similar to the current frame block. Generally, a reference frame is a frame just before a frame to be currently coded, in terms of time. But, for a bidirectional predicted frame (B frame) of MPEG-2, a reference frame may be a frame after a frame to be currently coded, in terms of time. Therefore, the previous frame expressed in the above description made in conjunction with FIGS. 1 and 2 is a reference frame, correctly speaking. Further, a reference frame may be either the original frame or reconstructed frame, as stated previously.

A conventional motion vector estimation method does not utilize information of macroblocks surrounding a macroblock of a current frame, but searches a previous frame for a portion most similar to the current frame macroblock. The conventional motion vector estimation method is also adapted to perform a motion vector estimation operation uniformly with respect to all blocks. Generally in the video coding system, the motion vector estimation operation requires the largest amount of computation. For this reason, the execution of the motion vector estimation operation for all blocks increases the coding time period in terms of software and the mount of power consumption of the motion estimation unit in terms of hardware, respectively.

SUMMARY OF THE INVENTION

Therefore, the present invention has been made in view of the above problems, and it is an object of the present invention to provide a motion estimation method and apparatus for determining whether to estimate a motion vector of a current block, on the basis of motion vectors of blocks around the current block, and selectively performing the motion vector estimation operation in accordance with the determined result, thereby reducing the coding time period and the amount of power consumed.

In accordance with one aspect of the present invention, the above and other objects can be accomplished by the provision of a motion estimation apparatus comprising motion vector estimation determination means for receiving motion vectors and motion prediction errors of macroblocks surrounding a macroblock to be currently coded and determining whether to perform a motion vector estimation operation, on the basis of the received motion vectors and motion prediction errors; a motion vector estimation unit for performing the motion vector estimation operation in response to a motion vector estimation enable signal from the motion vector estimation determination means; a switch for selecting one of the outputs from the motion vector estimation determination means and motion vector estimation unit in accordance with the result determined by the motion vector estimation determination means; and a memory for storing an input frame and a reference frame and providing the stored input frame and reference frame to the motion vector estimation determination means and motion vector estimation unit.

In accordance with another aspect of the present invention, there is provided a motion estimation apparatus comprising motion vector estimation determination means for receiving motion vectors and motion prediction errors of macroblocks surrounding a macroblock to be currently coded and determining whether to perform a motion vector estimation operation, on the basis of the received motion vectors and motion prediction errors; a first motion vector estimation unit for performing the motion vector estimation operation in a relatively large pixel unit in response to a motion vector estimation enable signal from the motion vector estimation determination means; a switch for selecting one of outputs from the motion vector estimation determination means and first motion vector estimation unit in accordance with the result determined by the motion vector estimation determination means; a second motion vector estimation unit for performing the motion vector estimation operation in a relatively minute pixel unit using a motion vector selected by the switch; and a memory for storing an input frame and a reference frame and providing the stored input frame and reference frame to the motion vector estimation determination means, first motion vector estimation unit and second motion vector estimation unit.

In accordance with yet another aspect of the present invention, there is provided a motion estimation method comprising first determining a predicted motion vector referring to a plurality of macroblocks surrounding a macroblock to be currently coded, as a predicted motion vector; the second step of performing a motion compensated prediction operation for the macroblock to be currently coded, using the predicted motion vector selected at the above first step, to obtain a motion compensated prediction error; the third step of determining a threshold value using motion prediction errors of the macroblocks surrounding the macroblock to be currently coded; the fourth step of determining whether the motion compensated prediction error obtained at the above second step is smaller than or equal to the threshold value determined at the above third step; the fifth step of performing no motion vector estimation operation and determining the predicted motion vector selected at the above first step as the final motion vector, if it is determined at the above fourth step that the motion compensated prediction error obtained at the above second step is smaller than or equal to the threshold value determined at the above third step; and the sixth step of performing the motion vector estimation operation to determine an estimated motion vector as the final motion vector, if it is determined at the above fourth step that the motion compensated prediction error obtained at the above second step is greater than the threshold value determined at the above third step.

BRIEF DESCRIPTION OF THE DRAWINGS

The above and other objects, features and advantages of the present invention will be more clearly understood from the following detailed description taken in conjunction with the accompanying drawings, in which:

FIG. 3 is a view typically showing the position of a macroblock to be currently coded and the positions of the surrounding macroblocks used for the prediction of a motion vector of the macroblock to be currently coded;

FIG. 4 is a detailed block diagram of a motion estimation unit in the motion compensation predictor of FIG. 2;

DETAILED DESCRIPTION OF THE PREFERRED EMBODIMENTS

Figure 1:
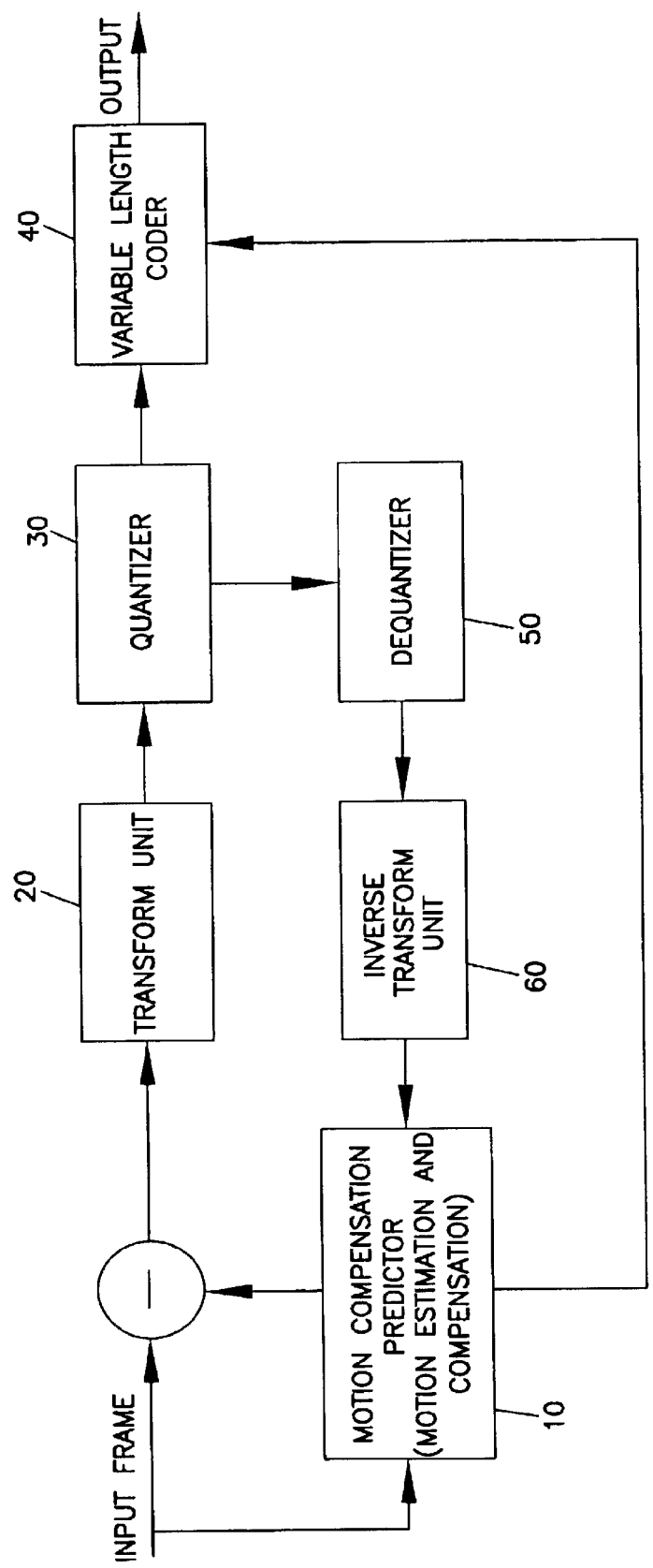
FIG. 1 is a block diagram showing the construction of a conventional digital video coding system.
Figure 2:
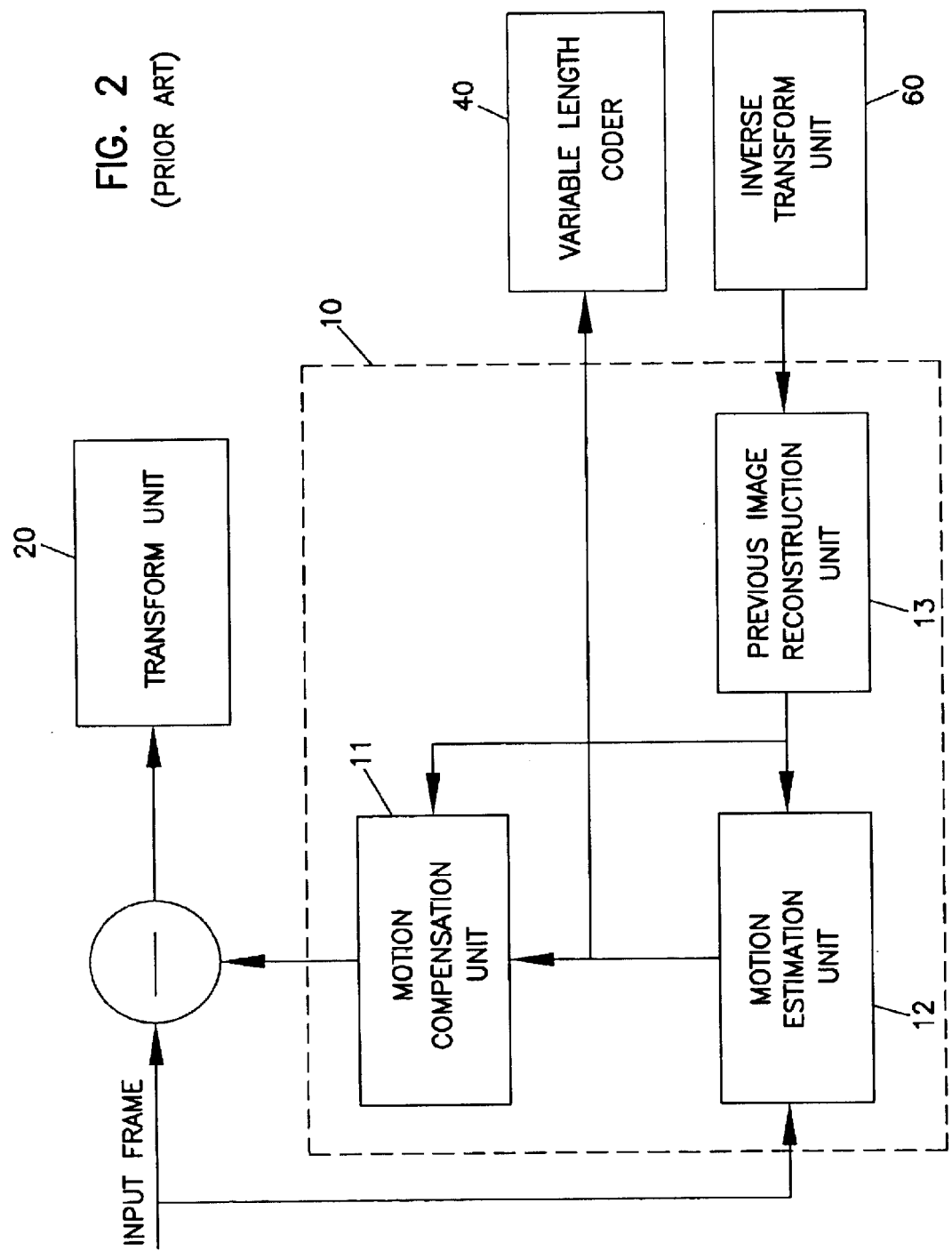
FIG. 2 is a detailed block diagram of a motion compensation predictor in the conventional digital video coding system of FIG. 1.

Abbreviations used in the specification can be defined as follows before describing the present invention in detail.

The reference character "MB_X" denotes a macroblock to be currently coded.

The reference character "MB_A" denotes a macroblock positioned just at the left-hand side of MB_X.

The reference character "MB_B" denotes a macroblock positioned just above MB_X.

The reference character "MB_C" denotes a macroblock positioned just above the right-hand side of MB_X.

The reference character "MV_m" denotes a motion vector of a macroblock m (m=A, B and C).

The reference character "MVp" denotes a predicted motion vector of MV_X.

The reference character "SAD" denotes the sum of absolute differences of an N×N macroblock (U,V), which can be defined by the following equation 1.

$$SAD = \sum_{i=0}^{N-1}\sum_{j=0}^{N-1} |U(i,j) - V(i,j)| \quad \text{[Equation 1]}$$

The reference character "SAD_m" denotes an SAD of a macroblock m (m=A, B and C) obtained by performing a motion compensation operation with MV_m.

The reference character "SAD_X" denotes an SAD obtained by performing the motion compensation operation with the predicted motion vector MVp.

The reference character "Median( )" denotes a function for extracting the median value of elements in parentheses. For example, Median(1,3,7)=3.

Figure 5:
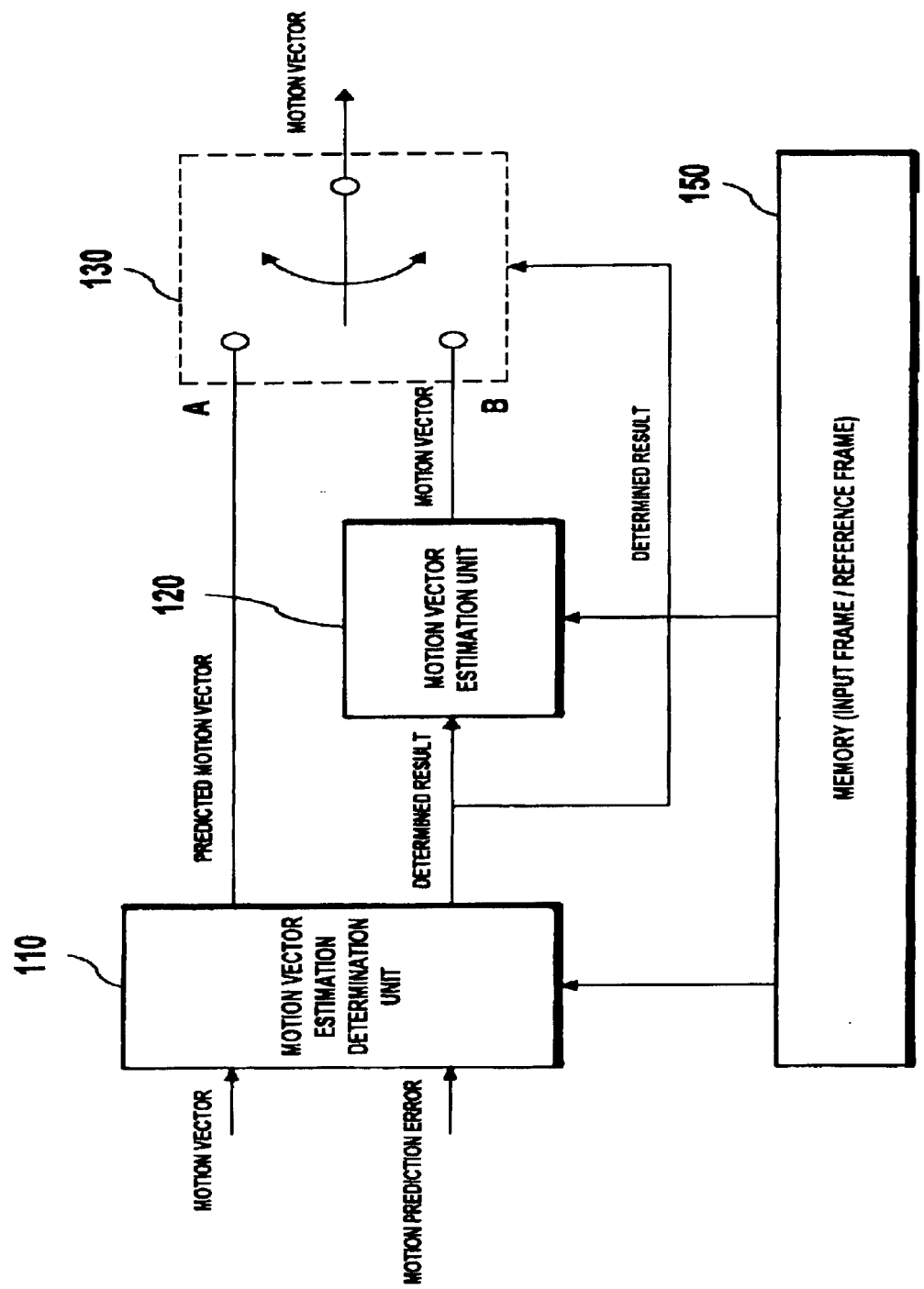
FIG. 5 is a block diagram showing the construction of a motion estimation apparatus in accordance with the preferred embodiment of the present invention.

FIG. 5 is a block diagram showing the construction of a motion estimation apparatus in accordance with the preferred embodiment of the present invention. As shown in this drawing, the motion estimation apparatus comprises a motion vector estimation determination unit 110 for receiving motion vectors MV_A, MV_B and MV_C and motion prediction errors SAD_A, SAD_B and SAD_C of macroblocks MB_A, MB_B and MB_C surrounding a macroblock MB_X to be currently coded and determining whether to perform a motion vector estimation operation, on the basis of the received motion vectors and motion prediction errors. The motion estimation determination unit 110 can provide two types of 'determined result' outputs as follows.

Case 1: The motion estimation determination unit 110 determines that the motion vector estimation operation will not be performed. This 'determined result' is provided as an input to a motion vector estimation unit 120 to disable (turn off) the unit 120. Further, the motion estimation determination unit 110 provides a predicted motion vector A as an input to a switch 130. The 'determined result' is also applied to a selection terminal of the switch 130, thereby causing the switch 130 to select and output the predicted motion vector A.

Case 2: The motion estimation determination unit 110 determines that the motion vector estimation operation will be performed. The motion vector estimation operation in this case is performed in the same manner as the conventional one. That is, the motion vector estimation unit 120 is enabled to obtain a motion vector B as a result of the motion estimation and provide the obtained motion vector B as an input to the switch 130. The 'determined result' is applied to the selection terminal of the switch 130, thereby causing the switch 130 to select and output the motion vector B differently from the first case. In FIG. 5, the reference numeral 150 denotes a memory acting to store an input frame to be coded and a reference frame.

Although, in the above description, the number of used macroblocks surrounding a macroblock to be currently coded is 3 and used motion prediction errors as SADs, they are not limited to specific elements. For example, four or more surrounding macroblocks may be used and any other values than SADs may be used for the calculation of motion prediction errors. At any rate, three surrounding macroblocks and SADs as motion prediction errors will hereinafter be used for the convenience of description.

Figure 6:
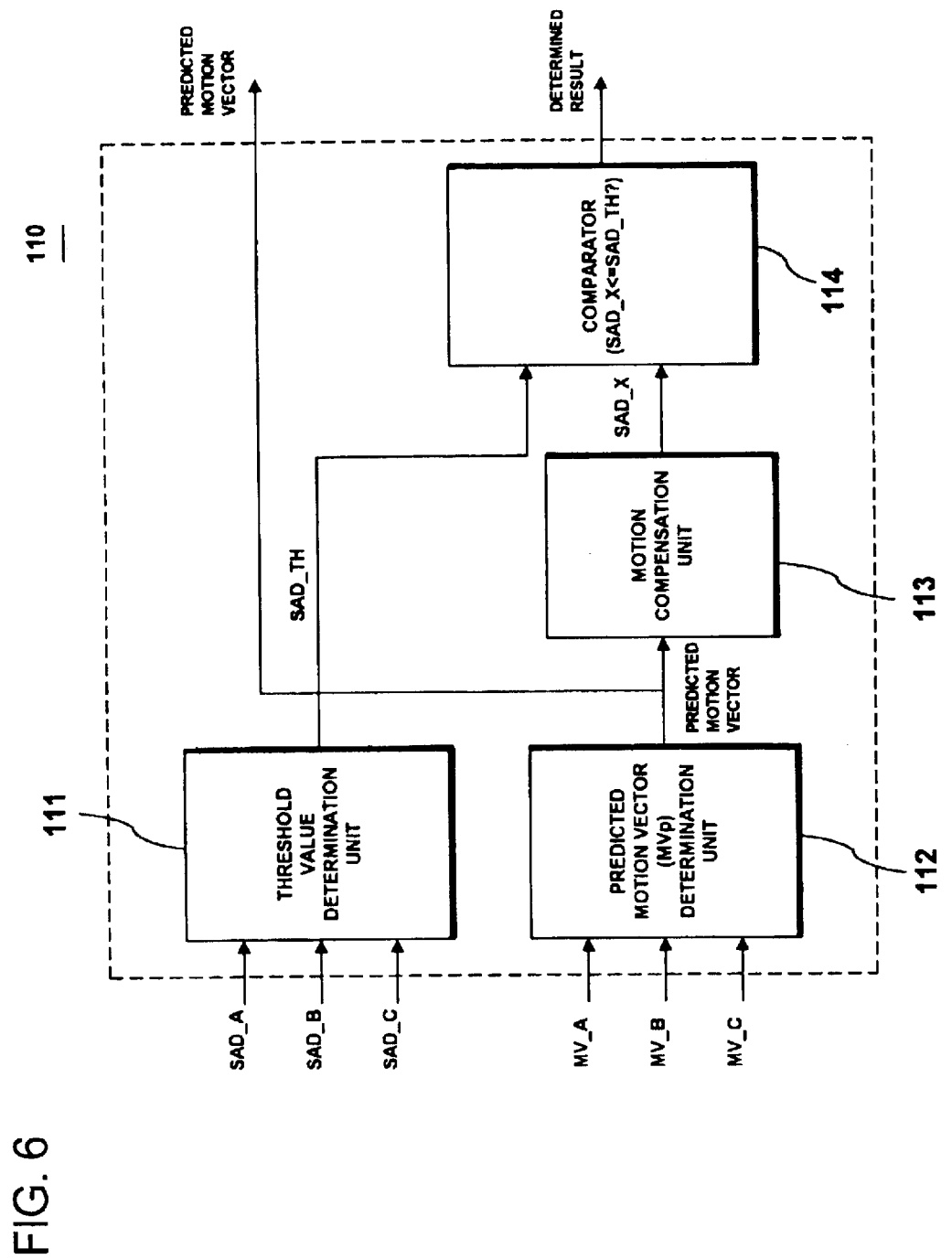
FIG. 6 is a detailed block diagram of a motion vector estimation determination unit in the motion estimation apparatus of FIG. 5.

FIG. 6 is a detailed block diagram of the motion vector estimation determination unit 110 in the motion estimation apparatus of FIG. 5. As shown in this drawing, the motion vector estimation determination unit 110 includes a threshold value determination unit 111 for determining a threshold value SAD_TH according to the motion prediction errors SAD_A, SAD_B and SAD_C of the macroblocks MB_A, MB_B and MB_C surrounding the macroblock MB_X to be currently coded, a predicted motion vector determination unit 112 for determining a predicted motion vector MVp according to the motion vectors MV_A, MV_B and MV_C of the surrounding macroblocks MB_A, MB_B and MB_C, a motion compensation unit 113 for performing a motion compensation operation using the predicted motion vector MVp determined by the predicted motion vector determination unit 112, and a comparator 114 for comparing a motion compensated prediction error SAD_X from the motion compensation unit 113 with the threshold value SAD_TH determined by the threshold value determination unit 111. Although not shown in FIG. 6, a current frame and a reference frame must be provided as inputs to the motion compensation unit 113 for the extraction of the motion compensated prediction error, as in FIG. 5.

Notably, because the surrounding blocks MB_A, MB_B and MB_C are macroblocks already coded at the time point of coding the macroblock MB_X to be currently coded, their motion vectors MV_A, MV_B and MV_C and motion prediction errors SAD_A, SAD_B and SAD_C, obtained by performing the motion compensation operation with the motion vectors MV_A, MV_B and MV_C, are all known values. Although not shown in FIG. 6, a memory must be provided to store the obtained motion vectors and prediction errors for use in the later macroblock motion vector estimation.

The threshold value determination unit 111 is adapted to determine the threshold value SAD_TH using the motion prediction errors SAD_A, SAD_B and SAD_C. In one determination method, the threshold value determination unit 111 can determine the maximum value of the motion prediction errors SAD_A, SAD_B and SAD_C as the threshold value SAD_TH. In another determination method, the threshold value determination unit 111 may determine the median or minimum value of the motion prediction errors SAD_A, SAD_B and SAD_C as the threshold value SAD_TH.

The predicted motion vector determination unit 112 is adapted to determine the predicted motion vector MVp using the motion vectors MV_A, MV_B and MV_C. Preferably, the predicted motion vector determination unit 112 determines the median value of the motion vectors MV_A, MV_B and MV_C as the predicted motion vector MVp. Because MV_A, MV_B and MV_C are vectors consisting of x and y-components, their median value can be calculated with respect to the respective components as in the following equation 2.

$$MVp(X)=\text{Median}(MV\_A(x),MV\_B(x),MV\_C(x)) \quad MVp(y)=\text{Median}(MV\_A(y),MV\_B(y),MV\_C(y)) \quad \text{[Equation 2]}$$

where, MVp(x), MV_A(x), MV_B(x) and MV_C(x) are x-components of the corresponding motion vectors and MVp(y), MV_A(y), MV_B(y) and MV_C(y) are y-components of the corresponding motion vectors.

As an alternative, the predicted motion vector determination unit 112 may determine the maximum or minimum value of the motion vectors MV_A, MV_B and MV_C as the predicted motion vector MVp. But, it should be noted that this determination has a close correlation with a motion vector coding method. For example, in the above-mentioned case of H.263 or MPEG-4, a difference vector between the median value of motion vectors of the surrounding macroblocks and the current motion vector is variable length coded for motion vector prediction coding. In this regard, the determination of the median value as the predicted motion vector in FIG. 6 enables the smallest number of bits to be coded because a motion vector value to be variable length coded becomes 0. As a result, the coding efficiency is best.

The motion compensation unit 113 is adapted to perform the motion compensation operation using the predicted motion vector MVp determined by the predicted motion vector determination unit 112. Assuming that a reference frame is P(i,j), a current frame is C(i,j) and the coordinates of a macroblock positioned just above the left-hand side of MB_X are (m,n), the motion compensated prediction error SAD_X can be given as in the following equation 3.

$$SADX = \sum_{j=0}^{N-1}\sum_{i=0}^{N-1} |p(m+i, n+j) - C(m+i+MVp(x), n+j+MVp(y))| \quad \text{[Equation 3]}$$

In FIG. 6, the comparator 114 is adapted to compare the motion compensated prediction error SAD_X from the motion compensation unit 113 with the threshold value SAD_TH determined by the threshold value determination unit 111. If the motion compensated prediction error SAD_X is smaller than or equal to the threshold value SAD_TH, the comparator 114 outputs a signal disabling the motion vector estimation unit 120 in FIG. 5 and the predicted motion vector MVp. However, in the case where the motion compensated prediction error SAD_X is greater than the threshold value SAD_TH, the comparator 114 outputs a signal enabling the motion vector estimation unit 120. The determined result signal from the comparator 114 is applied as a selection signal to the switch 130 in FIG. 5 such that the switch 130 selects the predicted motion vector A or the motion vector B obtained as a result of the motion vector estimation in accordance with the determined result.

In the present invention, provided that the predicted motion vector MVp has a higher precision than a half precision, the motion compensation unit 113 acts to perform an interpolation operation for motion compensation. Because the interpolation operation results in an increase in the amount of computation, the motion compensation unit 113 may perform the motion compensation operation by truncating the predicted motion vector MVp to change the half precision to an integer precision. Here, any other precision than the integer precision may be freely selected by a designer. Moreover, even when the motion vectors of the surrounding macroblocks are not available for the half precision, motion vectors having the integer precision may be used. For example, the motion vectors of MB_B and MB_C may have the half precision although the motion vector of MB_A has the integer precision.

On the other hand, in another embodiment of the present invention, the motion vector estimation determination unit 110 may be positioned in the motion vector estimation unit 120 so that it can be operated using data inputted upon the activation of the unit 120. This construction has the effect of reducing the number of memory accesses. In other words, both the motion vector estimation unit 120 and motion estimation determination unit 110 must access the memory storing input frame and reference frame information. To this end, they may use the memory not separately, but at the same time.

Figure 7:
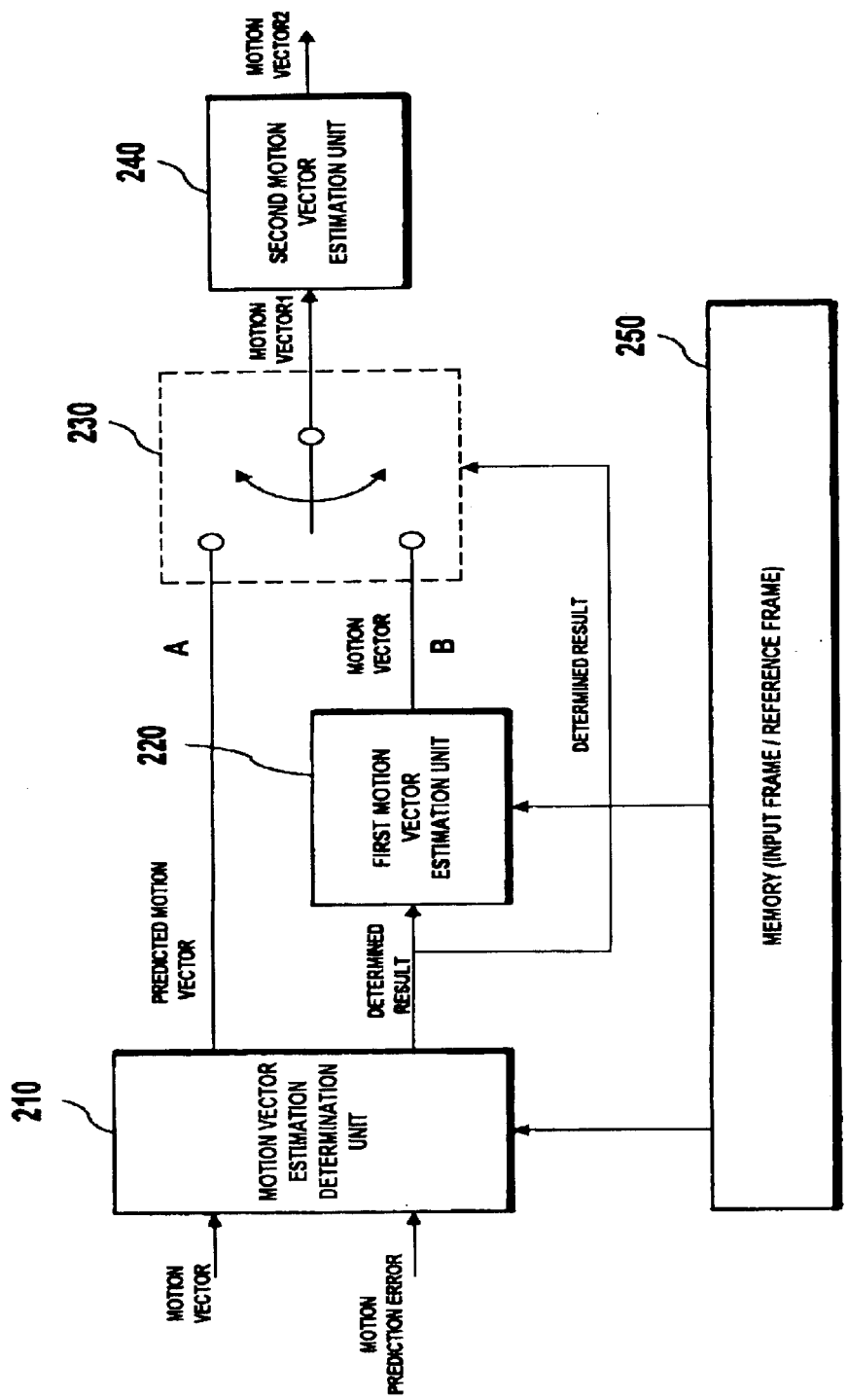
FIG. 7 is a block diagram showing the construction of a motion estimation apparatus in accordance with an alternative embodiment of the present invention.

FIG. 7 is a block diagram showing the construction of a motion estimation apparatus in accordance with an alternative embodiment of the present invention. As shown in this drawing, the motion estimation apparatus comprises a motion vector estimation determination unit 210 for receiving motion vectors and motion prediction errors of macroblocks surrounding a macroblock to be currently coded and determining whether to perform a motion vector estimation operation, on the basis of the received motion vectors and motion prediction errors, a first motion vector estimation unit 220 for performing the motion vector estimation operation in a relatively large pixel unit in response to a motion vector estimation enable signal from the motion vector estimation determination unit 210, a switch 230 for selecting one of outputs from the motion vector estimation determination unit 210 and first motion vector estimation unit 220 in accordance with the result determined by the motion vector estimation determination unit 210, a second motion vector estimation unit 240 for performing the motion vector estimation operation in a relatively minute pixel unit using a motion vector selected by the switch 230, and a memory 250 for storing an input frame to be coded and a reference frame.

In FIG. 7, the switch 230 is adapted to select and output one of two inputs in response to an input to its selection terminal. The switch 230 provides a motion vector 1 as an input to the second motion estimation unit 240. The second motion estimation unit 240 searches more minutely for motion vectors around the motion vector 1 and thus outputs a motion vector 2.

As stated previously with reference to FIG. 4, the search-based motion vector estimation methods may be classified into the relatively large pixel-unit motion vector estimation and the relatively minute pixel-unit motion vector estimation. But, in the present invention, the motion vector search method is not limited to a specific method. For example, the first motion vector estimation unit 220 may perform the motion vector estimation operation in an integer-pixel unit, for example, in the unit of one pixel or of two or more pixels. The second motion vector estimation unit 240 may perform the motion vector estimation operation in a minuter unit, for example, in a half-pixel unit for motion vectors around the motion vector 1 obtained by the first motion vector estimation unit 220.

Figure 8:
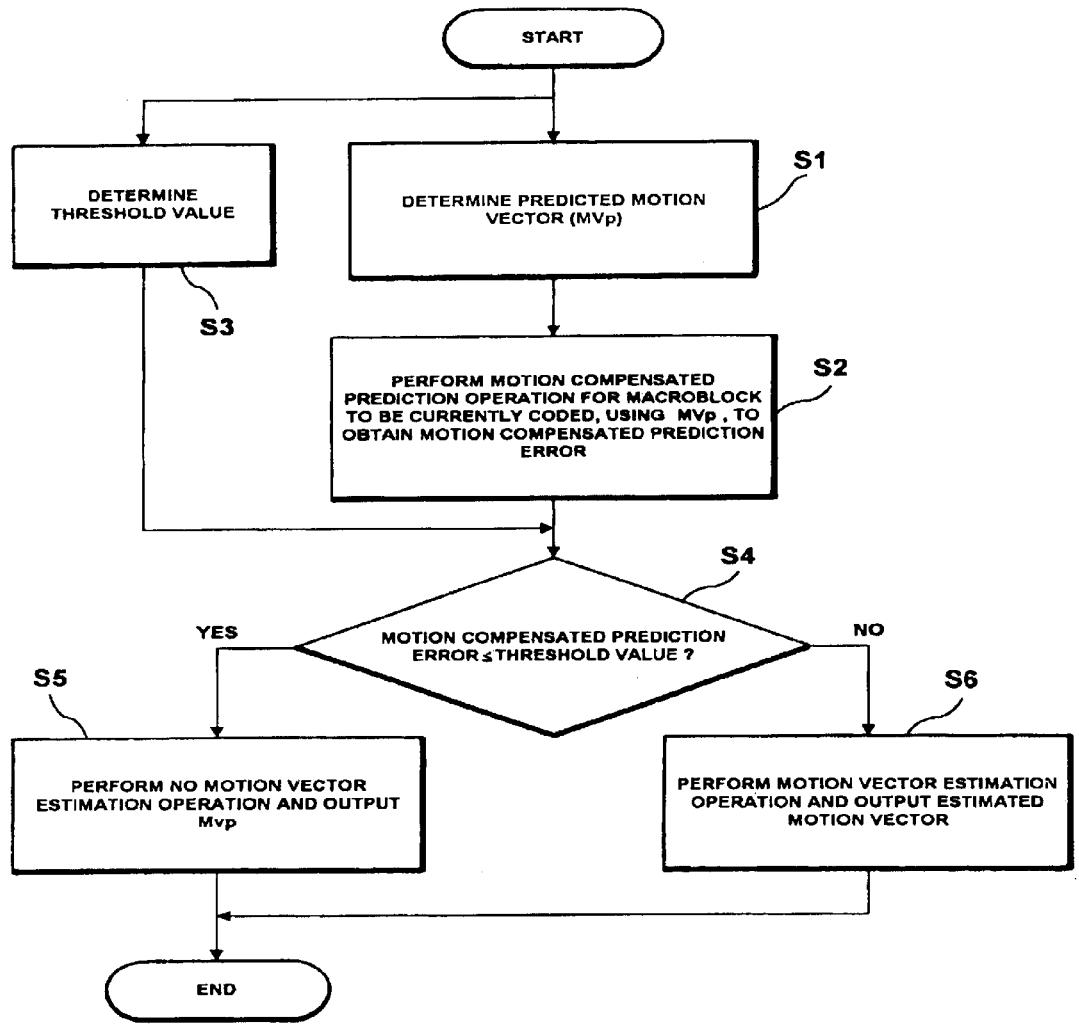
FIG. 8 is a flowchart illustrating a motion estimation method in accordance with the present invention.

FIG. 8 is a flowchart illustrating a motion estimation method in accordance with the present invention, more particularly a procedure for determining whether to perform a motion vector estimation operation for a current macroblock. As shown in this drawing, the motion estimation method comprises the first step of selecting one of motion vectors of a plurality of macroblocks surrounding a macroblock to be currently coded, as a predicted motion vector, the second step of performing a motion compensated prediction operation for the macroblock to be currently coded, using the predicted motion vector selected at the above first step, to obtain a motion compensated prediction error, the third step of determining a threshold value using motion prediction errors of the macroblocks surrounding the macroblock to be currently coded, the fourth step of determining whether the motion compensated prediction error obtained at the above second step is smaller than or equal to the threshold value determined at the above third step, the fifth step of performing no motion vector estimation operation and determining the predicted motion vector selected at the above first step as the final motion vector, if it is determined at the above fourth step that the motion compensated prediction error obtained at the above second step is smaller than or equal to the threshold value determined at the above third step, and the sixth step of performing the motion vector estimation operation to determine an estimated motion vector as the final motion vector, if it is determined at the above fourth step that the motion compensated prediction error obtained at the above second step is greater than the threshold value determined at the above third step.

In the present invention, the motion estimation method can perform the motion vector estimation operation on the basis of motion vectors and motion prediction errors of three or four macroblocks surrounding a macroblock to be currently coded, but the number of available surrounding macroblocks is not limited to a particular value. However, provided that three macroblocks, or the left, upper and right macroblocks, as shown in FIG. 3 are applied to a motion vector coding method such as H.263 or MPEG-4, it is preferred that the present motion estimation method employs the same number of macroblocks to share the memory and increase the coding efficiency.

In the present invention, the predicted motion vector selection and the motion prediction error definition are not limited to particular elements. But, for the convenience of description beginning with FIG. 6, the surrounding macroblocks are defined as the left macroblock MB_A, the upper macroblock MB_B and the upper right macroblock MB_C as shown in FIG. 3, and the motion compensated prediction error is defined as one of the motion prediction errors of those three macroblocks. Also, the motion prediction error is defined as the SAD (Sum of Absolute Difference).

Next, a more detailed description will be given of the motion estimation method in accordance with the present invention.

At the first step S1, the predicted motion vector MVp is determined on the basis of the motion vectors MV_A, MV_B and MV_C of the macroblocks MB_A, MB_B and MB_C surrounding the macroblock MB_X to be currently coded. Preferably, the predicted motion vector MVp is determined to be the median value of the motion vectors MV_A, MV_B and MV_C, namely, MVp=Median (MV_A,MV_B,MV_C). In this case, the predicted motion vector MVp is obtained respectively for an x-MV component and y-MV component (see Equation 2). As an alternative to the median value, the prediction motion vector MVp may be determined to be the average value, minimum value or maximum value of the motion vectors MV_A, MV_B and MV_C.

At the second step S2, the motion compensated prediction error SAD_X is obtained by performing the motion compensated prediction operation for the macroblock to be currently coded, using the predicted motion vector MVp determined at the above first step.

At the third step S3, the threshold value SAD_TH is determined using the motion prediction errors SAD_A, SAD_B and SAD_C of the macroblocks surrounding the macroblock to be currently coded. Preferably, the median value of the motion prediction errors SAD_A, SAD_B and SAD_C of the surrounding macroblocks is determined as the threshold value SAD_TH. Namely, SAD_TH=Median (SAD_A,SAD_B,SAD_C). Alternatively, the threshold value SAD_TH may be determined to be the average value, minimum value or maximum value of the motion prediction errors SAD_A, SAD_B and SAD_C of the surrounding macroblocks.

At the fourth step S4, whether to perform the motion vector estimation operation is determined by comparing the motion compensated prediction error SAD_X obtained at the above second step with the threshold value SAD_TH obtained at the above third step. If the motion compensated prediction error SAD_X is smaller than or equal to the threshold value SAD_TH, the motion vector estimation operation is not performed and the predicted motion vector MVp selected at the above first step is outputted as the final motion vector. To the contrary, if the motion compensated prediction error SAD_X is greater than the threshold value SAD_TH, the motion vector estimation operation is performed and an estimated motion vector is outputted as the final motion vector.

The proposed apparatus and method of FIGS. 6, 7 and 8 have been disclosed in conjunction with the most general embodiments. Various modifications other than those are possible and more specific conditions may be considered.

Firstly, a macroblock to be currently coded may be positioned at the edge of a frame and some or all of the surrounding macroblocks may be positioned outside the frame. In this case, motion vectors of the surrounding macroblocks and a motion compensated prediction error must be defined according to the given rules. It is most preferred that the motion vectors are determined according to a motion vector coding method. Provided that the present invention is applied to an MPEG-4 coding system and method, the motion vectors will be defined in the same manner as that defined in MPEG-4 for the motion vector coding. It is preferred that the motion compensated prediction error is defined as an arbitrary large value to minimize as much as possible the influence by the surrounding macroblocks outside the frame. For example, assuming that SAD_A=100, SAD_B=200 and SAD_C is not valid, the larger value of SAD_A and SAD_B is determined as SAD_C. That is, SAD_C=SAD_B.

Secondly, the motion compensation operation may be performed on the basis of four motion vectors per one surrounding macroblock. In this case, each surrounding macroblock is partitioned into four nonoverlapping blocks, or the upper left block, lower left block, upper right block and lower right block, the optimum motion vector is obtained for each of the partitioned blocks, and the motion compensation operation is then performed using the obtained four motion vectors of each surrounding macroblock. This mode is more effective in H.263 and MPEG-4 for a smaller frame. In the case where this mode is applied to the surrounding macroblocks, a predicted motion vector MVp is determined according to a method defined in MPEG-4. A value four times a motion prediction error of each macroblock in this mode is compared with a motion prediction error of each macroblock in the existing mode. In other words, the number of pixels used to obtain the motion prediction error in this mode is ¼ that of pixels used in the existing mode, because four motion vectors per one macroblock are used in this mode, whereas one motion vector per one macroblock is used in the existing mode. For this reason, it is required that the number of pixels in the two modes be equal.

As apparent from the above description, the present invention provides a motion vector estimation method and apparatus which can use a predicted motion vector MVp for coding, with respect to a block whose motion vector estimation is determined to be not required. Therefore, the motion vector estimation apparatus can be reduced in the amounts of computation and power consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motion estimation apparatus comprising:
   motion vector estimation determination means for receiving motion vectors and motion prediction errors of macroblocks surrounding a macroblock to be currently coded and determining whether to perform a motion vector estimation operation, on the basis of the received motion vectors and motion prediction errors;
   a motion vector estimation unit for performing the motion vector estimation operation in response to a motion vector estimation enable signal from said motion vector estimation determination means;
   a switch for selecting one of outputs from said motion vector estimation determination means and motion vector estimation unit in accordance with a result determined by said motion vector estimation determination means; and
   a memory for storing an input frame and a reference frame and providing the stored input frame and reference frame to said motion vector estimation determination means and motion vector estimation unit.

2. A motion estimation apparatus as set forth in claim 1, wherein said motion vector estimation determination means includes:
   a threshold value determination unit for determining a threshold value according to said motion prediction errors of said macroblocks surrounding said macroblock to be currently coded;
   a predicted motion vector determination unit for determining a predicted motion vector according to said motion vectors of said surrounding macroblocks;
   a motion compensation unit for performing a motion compensation operation using the predicted motion vector determined by said predicted motion vector determination unit; and
   a comparator for comparing a motion compensated prediction error from said motion compensation unit with said threshold value determined by said threshold value determination unit.

3. A motion estimation apparatus as set forth in claim 1, wherein said macroblocks surrounding said macroblock to be currently coded are three in number.

4. A motion estimation apparatus as set forth in claim 2, wherein said threshold value determination unit includes means for determining the sum of absolute differences of one macroblock between a previous frame and a current frame as each of said motion prediction errors of said macroblocks surrounding said macroblock to be currently coded.

5. A motion estimation apparatus as set forth in claim 2, wherein said comparator is adapted to output a motion vector estimation disable signal to said motion vector estimation unit if said motion compensated prediction error from said motion compensation unit is smaller than or equal to said threshold value from said threshold value determination unit, and said motion vector estimation enable signal to said motion vector estimation unit if said motion compensated prediction error from said motion compensation unit is greater than said threshold value from said threshold value determination unit.

6. A motion estimation apparatus as set forth in claim 2, wherein said threshold value determination unit is adapted to determine a median value of said motion prediction errors of said macroblocks surrounding said macroblock to be currently coded, as said threshold value.

7. A motion estimation apparatus as set forth in claim 2, wherein said threshold value determination unit is adapted to determine a maximum value of said motion prediction errors of said macroblocks surrounding said macroblock to be currently coded, as said threshold value.

8. A motion estimation apparatus as set forth in claim 2, wherein said threshold value determination unit is adapted to determine a minimum value of said motion prediction errors of said macroblocks surrounding said macroblock to be currently coded, as said threshold value.

9. A motion estimation apparatus as set forth in claim 2, wherein said threshold value determination unit includes means for, when said macroblock to be currently coded is positioned at an edge of a corresponding frame or a given coding mode is an intraframe coding mode, determining a maximum value of motion prediction errors of macroblocks inside said corresponding frame as a motion prediction error of a macroblock outside said corresponding frame.

10. A motion estimation apparatus as set forth in claim 2, wherein said predicted motion vector determination unit is adapted to determine a median value of said motion vectors of said macroblocks surrounding said macroblock to be currently coded, as said predicted motion vector.

11. A motion estimation apparatus as set forth in claim 2, wherein said predicted motion vector determination unit is adapted to, when said macroblock to be currently coded is positioned at an edge of a corresponding frame or a given coding mode is an intraframe coding mode, determine a motion vector of said macroblock to be currently coded, to be 0.

* * * * *